United States Patent
Shimazaki et al.

(10) Patent No.: US 7,659,224 B2
(45) Date of Patent: Feb. 9, 2010

(54) CATALYST NANOPARTICLE

(75) Inventors: Yuzuru Shimazaki, Sendai (JP); Yoshio Kobayashi, Sendai (JP); Mikio Konno, Sendai (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 11/531,632

(22) Filed: Sep. 13, 2006

(65) Prior Publication Data

US 2007/0026294 A1 Feb. 1, 2007
US 2009/0297924 A9 Dec. 3, 2009

Related U.S. Application Data

(63) Continuation of application No. PCT/JP2005/003281, filed on Feb. 28, 2005.

(30) Foreign Application Priority Data

Mar. 25, 2004 (JP) .............................. 2004-089691

(51) Int. Cl.
*H01M 4/88* (2006.01)
*B01J 21/18* (2006.01)
*B01J 21/00* (2006.01)
*B01J 23/42* (2006.01)
*B01J 23/44* (2006.01)
*B32B 5/16* (2006.01)
*C22C 19/03* (2006.01)
*C22C 5/04* (2006.01)
*C09K 3/14* (2006.01)
*B24D 3/02* (2006.01)
*C09C 1/68* (2006.01)
*H01M 4/00* (2006.01)

(52) U.S. Cl. ........................ 502/180; 502/101; 502/182; 502/185; 502/261; 502/262; 502/339; 428/403; 420/460; 420/466; 51/307; 51/309; 429/40; 977/773; 977/775; 977/810; 977/811

(58) Field of Classification Search ................. 502/261, 502/262, 339, 182, 185, 180; 428/403; 977/773, 977/775, 810, 811; 420/460, 466; 51/307, 51/309; 429/40
See application file for complete search history.

(56) References Cited

U.S. PATENT DOCUMENTS 4,425,261 A * 1/1984 Stenius et al. ............... 502/339
(Continued)

FOREIGN PATENT DOCUMENTS

EP 0 794 006 9/1997
(Continued)

OTHER PUBLICATIONS

Liz-Marzan et al., "Synthesis of Nanosized Gold-Silica Core-Shell Particles", Langmuir 1996, 12, pp. 4329-4335.
(Continued)

*Primary Examiner*—Patricia L Hailey
(74) *Attorney, Agent, or Firm*—Antonelli, Terry, Stout & Kraus, LLP.

(57) ABSTRACT

Although nanoparticles capable of providing an extremely large active surface area have highly marked advantages, when a PEFC electrode utilizing nanoparticles is used for a prolonged period of time, the catalyst nanoparticles on carrier of the PEFC electrode because of the nano-size thereof migrate and aggregate together to result in a rapid loss of activity. Thus, there is a demand for inhibition of the above aggregation so as to prevent any drop of catalytic activity. According to the present invention the aggregation of nanoparticles can be inhibited by catalyst nanoparticles containing Pt wherein a porous matter containing an inorganic oxide is disposed on the surface of the catalyst nanoparticles. When use is made of nanoparticles whose surface has undergone specific modification, excellent activity can be realized. Therefore, there are provided surface-modified nanoparticles and catalyst and further a PEFC electrode utilizing these nanoparticles.

21 Claims, 4 Drawing Sheets

U.S. PATENT DOCUMENTS

| | | | | |
|---|---|---|---|---|
| 6,165,247 | A | * | 12/2000 | Kodas et al. .................. 75/331 |
| 6,548,168 | B1 | * | 4/2003 | Mulvaney et al. ........... 428/402 |
| 6,582,763 | B1 | * | 6/2003 | Nishimura et al. .......... 427/216 |
| 6,663,799 | B2 | | 12/2003 | Kokubo et al. .............. 252/512 |
| 6,964,757 | B2 | * | 11/2005 | Cortright et al. ......... 423/648.1 |
| 7,365,011 | B2 | * | 4/2008 | Lavoie et al. ............... 438/687 |
| 7,449,237 | B2 | * | 11/2008 | Chan et al. .................. 428/403 |
| 2003/0091883 | A1 | | 5/2003 | Peled et al. ................... 429/25 |
| 2007/0077430 | A1 | * | 4/2007 | Chen et al. .................. 428/403 |
| 2007/0087196 | A1 | * | 4/2007 | Ruehle et al. ............... 428/403 |

FOREIGN PATENT DOCUMENTS

| | | | |
|---|---|---|---|
| EP | 0 794 006 A1 | | 10/1997 |
| GB | 2 173 199 | * | 10/1986 |
| JP | 2002-134123 | | 5/2002 |
| JP | 2002-246033 | | 8/2002 |
| JP | 2002-305000 | | 10/2002 |
| JP | 2005-244117 | * | 9/2005 |
| JP | 2005-276688 | * | 10/2005 |
| WO | WO 2005/093881 A1 | | 10/2005 |

OTHER PUBLICATIONS

Yoshitake et al., "Preparation of fine platinum catalyst supported on single-wall carbon nanohorns for fuel cell application", Physica B 323, 2002, pp. 124-126.

Anderson et al., "Enhancing the Activity of Fuel-Cell Reactions by Designing Three-Dimensional Nanostructured Architectures: Catalyst-modified Carbon-Silica Composite Aerogels", Nano Letters, 2002, vol. 2, No. 3, pp. 235-240.

International Search Report for International Application No. PCT/JP2005/003281, dated May 31, 2005.

Enhancing the Activity of Fuel-cell Reactions by Designing Three-dimensional Nanostructured Architectures: Catalyst-modified Carbon-Silica Composite Aerogels, Anderson et al., Nano Letters 2002, vol. 2, No. 3, pp. 235-240.

Preparation of Fine Platinum Catalyst Supported on Single-wall Carbon Nanohorns for Fuel Cell Application, Yoshitake et al., Physica B 323 (2002), pp. 124-126.

Synthesis of Nanosized Gold—Silica Core—Shell Particles, Liz-Marzan et al., Langmuir 1996, 12, pp. 4329-4335.

* cited by examiner

US 7,659,224 B2

CATALYST NANOPARTICLE

CROSS-REFERENCE TO A RELATED APPLICATION

This application is a continuation of application No. PCT/JP2005/003281, filed Feb. 28, 2005, designating the United States.

TECHNICAL FIELD

This invention relates to surface-modified catalyst nanoparticles and to an application thereof.

BACKGROUND ART

Fuel cells, which have the possibility of attaining an energy density 10 times as high as that of lithium ion secondary batteries and can be carried anywhere provided that a fuel is carried with it, are expected to bring about great changes in criteria for designing mobile machines and tools. In particular, direct methanol fuel cells (DMFCs), which use methanol as the fuel, are expected to be rendered small-sized and lightweight and become low-cost. Further, much attention is also focused on such characteristics thereof that, in spite of their being small-sized, they are excellent in startability, responsiveness to load, and stability as power sources capable of satisfying those long-period drive requirements imposed by portable apparatus, typically cellular phones and notebook computers, and can generate electricity so long as a fuel is fed thereto, hence can be used for a long period of time.

Currently, in developing fuel cells, in particular DMFC-type fuel cells, it is demanded that a highly active material to serve as an oxidation catalyst for electrodes be developed.

Pt-containing nanoparticles are known to show potent oxidative catalytic activity against hydrogen and methanol and are utilized as catalysts for typical polymer electrolyte fuel cell (PEFC) electrodes. Since such noble metal-based catalysts are expensive, the usage thereof is required to be as low as possible. Therefore, it is necessary to increase their catalytic activity. For producing highly active catalysts, however, it is necessary to render the catalyst metal surface area as large as possible and, therefore, it is required that catalyst nanoparticles with a particle diameter of about 2-3 nm as supported on carbon as a carrier or support be used as catalysts for PEFC electrodes.

For preparing such catalysts for PEFC electrodes as mentioned above, two methods are available; the method comprising reducing a metal in ionic form in a solution in the presence of carbon as a support to cause precipitation of catalyst nanoparticles on the support carbon (e.g. Physica B, Vol. 323, page 124 (2002) [Non-Patent Document 1]) and the method comprising causing catalyst nanoparticles in a colloidal solution to be adsorbed on carbon as a support (e.g. Nano Letters, Vol. 2, page 235 (2002) [Non-Patent Document 2]). The catalysts prepared by the above methods are generally subjected to heat treatment prior to use to thereby remove the organic matter remaining on the particle surface and thus expose the catalyst metal on the catalyst nanoparticle surface.

However, catalyst nanoparticles with a particle diameter of 2-3 nm have a very large surface energy and show dispersion instability. Therefore, as the period of use of the catalyst is prolonged, a problem arises, namely the catalyst nanoparticles aggregate/agglomerate together and accordingly the catalyst metal surface area decreases, resulting in decreases in catalytic activity.

As reported in Physica B, Vol. 323, page 124 [Non-Patent Document 1], the above problem can be solved by using carbon nanohorns as the support carbon and thereby enabling Pt nanoparticles with a particle diameter of about 2 nm to be dispersed without aggregation/fusion together. Further, in Japanese Kokai Publication No. 2002-134123 [Patent Document 1], a technology is disclosed which comprises forming a covering layer containing a reducing silicon-containing macromolecular compound on the surface of a support carbon powder and causing Pt nanoparticles to precipitate/be carried in the coating layer to thereby prevent Pt nanoparticles from aggregation. However, on the occasion of long-term use of PEFC electrodes, the transfer of catalyst nanoparticles on the support carbon cannot be avoided, and the catalyst nanoparticles that have been transferred aggregate/agglomerate together, possibly resulting in decreases in catalyst metal surface area and decreases in catalytic activity.

On the other hand, a technology of preparing metal nanoparticles having a porous inorganic oxide on the surface thereof is described, for example, in Langmuir, Vol. 12, page 4329 (1996) [Non-Patent Document 3]. The authors of this article report that Au nanoparticles can be coated with a porous $SiO_2$ layer. However, there is no report as yet about a technology of preparing Pt-containing nanoparticles with a porous inorganic oxide on the surface thereof.

Patent Document 1: Japanese Kokai (Laid-Open) Publication No. 2002-134123
Non-Patent Document 1: Physica B, Vol. 323, pp. 124-126 (2002)
Non-Patent Document 2: Nano Letters, Vol. 2 (No. 3), pp. 235-240 (2002)
Non-Patent Document 3: Langmuir, Vol. 12 (No. 18), pp. 4329-4335 (1996)

DISCLOSURE OF THE INVENTION

Problems to be Solved by the Invention

With the advances in technology of forming minute particles comprising a metal, semiconductor, metal oxide or the like, those physical phenomena such as atom number effect, quantum size effect, volume effect and surface effect which cannot manifest themselves at bulk levels have been demonstrated typically at nanoparticle levels of several nanometers to 10 nanometers. Further, it is also possible to cause nanoparticles regularly arranged to perform a function that cannot be observed with single individual particles. For activating and utilizing such a function, it is essential to control the size, shape and structure of nanoparticles. Further, the conventional nanoparticles inevitably have a drawback such that, if the desired nanoparticles have once been formed, they are highly susceptible to the influences of the surface thereof, among others, and are physically and chemically unstable, undergoing changes in characteristics of the nanoparticles and/or becoming not uniform in dispersion due to aggregation, for instance.

In the case of highly active Pt-containing nanoparticles, which are useful as oxidation catalysts for electrodes of fuel cells and the like, a problem is also encountered; namely, when the metal particle diameter is made smaller to give nanoparticles with a diameter not greater than 20 nm, it becomes difficult for the particles to be stably supported due to thermodynamic instability and the oxidative atmosphere in the fuel cell inside, among others. Another problem is that when such impurities as carbon monoxide and sulfur come in and cover the catalyst surface, the catalyst undergoes the influence of poisoning and the catalytic activity thereof is reduced. A further problem is that when PEFC electrodes are used for a long period of time, for instance, the catalyst nanoparticles that have been transferred on the support carbon in the PEFC electrodes aggregate, resulting in decreases in catalytic activity.

Means for Solving the Problems

The present inventors made intensive investigations to overcome the above problems and, as a result, found that Pt-containing nanoparticles, when provided with an inorganic oxide-based porous substance on the surface thereof, are markedly prevented from being mutually aggregated and exhibit good characteristics, for example maintenance of the activity thereof. They produced catalysts using such surface-modified nanoparticles and further succeeded in providing polymer electrolyte fuel cells having superior properties. Thus, they have now completed the present invention.

The invention provides the following:

[1] Surface-modified metal nanoparticles characterized in that they are platinum group metal-containing nanoparticles having, on the surface thereof, a porous substance comprising an inorganic oxide.

[2] Nanoparticles as defined above under [1] characterized in that the surface-modified metal nanoparticles show a catalytic activity suited for their use in fuel cells.

[3] Nanoparticles as defined above under [1] or [2] characterized in that the nanoparticles are Pt nanoparticles.

[4] Nanoparticles as defined above under [1] or [2] characterized in that the nanoparticles are nanoparticles of an alloy of Pt and Ru.

[5] Nanoparticles as defined above under any of [1] to [4] characterized in that the nanoparticles have an average particle diameter not greater than 10 nm.

[6] Nanoparticles as defined above under any of [1] to [5] characterized in that the nanoparticles have an average particle diameter of about 2-10 nm.

[7] Nanoparticles as defined above under any of [1] to [6] characterized in that the inorganic oxide is $SiO_2$.

[8] A catalyst characterized in that it comprises the nanoparticles defined above under any of [1] to [7] as supported on a carrier or support.

[9] A nanoparticle-containing catalyst as defined above under [8] characterized in that it is a catalyst for a polymer electrolyte fuel cell (PEFC) electrode.

[10] A fuel cell electrode characterized in that the nanoparticles defined above under any of [1] to [7] are used as a catalyst for the electrode.

[11] A fuel cell characterized in that the fuel cell electrode defined above under [10] is used therein.

[12] A method of producing surface-modified metal nanoparticles characterized in that it comprises:

(1) the step of treating platinum group metal-containing nanoparticles with a coupling agent and (2) the step of forming a porous substance comprising an inorganic oxide in the presence of the silane coupling agent-treated nanoparticles, in that order to obtain surface-modified metal nanoparticles comprising the platinum group metal-containing nanoparticles with a porous substance comprising the inorganic oxide as formed on the surface thereof.

[13] A method of producing surface-modified metal nanoparticles as defined above under [12] characterized in that the surface-modified metal nanoparticles show a catalytic activity suited for their use in fuel cells.

[14] A method of producing surface-modified metal nanoparticles as defined above under [12] or [13] characterized in that the coupling agent is a silane coupling agent.

[15] A method of producing surface-modified metal nanoparticles characterized in that it comprises:

(1) the step of forming nanoparticles by subjecting a platinum group metal ion-containing solution to reduction treatment, (2) the step of treating the nanoparticles with a coupling agent and (3) the step of forming a porous substance comprising an inorganic oxide in the presence of the silane coupling agent-treated nanoparticles, in that order to obtain surface-modified metal nanoparticles comprising the platinum group metal-containing nanoparticles with a porous substance comprising the inorganic oxide as formed on the surface thereof and showing a catalytic activity suited for their use in fuel cells.

Effects of the Invention

By using the surface-modified nanoparticles of the present invention as well as the catalyst for PEFC electrodes which comprises the above-mentioned nanoparticles, it becomes possible to produce PEFC electrodes in which the catalyst particles are prevented from mutually aggregating/agglomerating together due to transfer thereof on the carbon support and which show no substantial decrease in catalytic activity even after a long period of use.

Other objects, features, advantages and relevant viewpoints of the present invention will become apparent to those skilled in the art from the description which follows. It is to be understood, however, that the description given in the present specification, including the following description and certain specific examples, provides preferred modes of embodiment of the invention and is given only for the purpose of illustration. Various changes and/or alterations (or modifications) based on the knowledge obtained from the following description and other parts of this specification within the purport and scope of the present invention as disclosed herein will be obvious to those skilled in the art. All the patent and reference documents cited herein have been cited for the purpose of illustration and the contents thereof should be included herein and interpreted as part of the present specification.

EXPLANATION OF SYMBOLS

Figure 1:
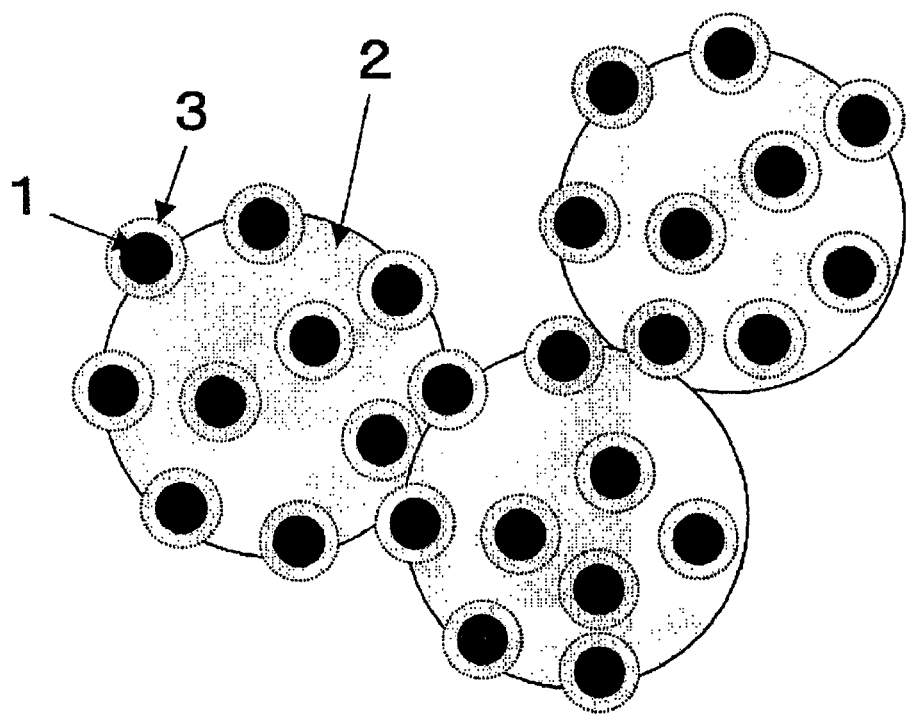
FIG. 1 This figure schematically illustrates the structure of a catalyst carrying porous inorganic oxide-coated alloy nanoparticles, with a porous inorganic oxide occurring on the surface of Pt—Ru alloy nanoparticles.

1—Pt—Ru alloy nanoparticle
2—Carbon support
3—Porous $SiO_2$ layer
11—Pt—Ru alloy nanoparticle
12—Carbon support
21—Pt nanoparticle
22—Carbon support
23—Porous $SiO_2$ layer
31—Pt nanoparticle
32—Carbon support

BEST MODES FOR CARYYING OUT THE INVENTION

The nanoparticles of the invention are metal nanoparticles comprising a platinum group transition metal expected to have potent activity as a catalyst for electrodes and/or alloy nanoparticles mainly composed of such platinum group transition metals. The platinum group transition metal is selected from among Pt, Ru, Ir, Pd, Os and Rh and may comprise a single species or a mixture thereof. Preferred are Pt nanoparticles and Pt—Ru nanoparticles. Preferably used as the catalyst nanoparticles of the invention are, in particular, Pt metal nanoparticles and Pt—Ru metal nanoparticles, which show potent oxidation activity against hydrogen and methanol. In a typical case, the metal nanoparticles mentioned above are not particularly restricted provided that they are Pt-containing nanoparticles. It is preferable, however, that they be constituted of Pt and at least one poisoning-preventing element selected from among elements effective in preventing poisoning of the Pt surface by carbon monoxide, e.g. Ru, Mo, W, Co, Fe and Ni.

The nanoparticles can be obtained by subjecting a solution (e.g. aqueous solution) containing a platinum group transition metal salt(s) to colloid formation conditions to obtain dispersion of the metal colloid. Typically, metal nanoparticles can be formed, for example, by the method comprising stirring an aqueous solution of a platinum group transition metal salt(s) in the presence of a reducing reagent.

The platinum salt includes those containing $Pt^{2+}$, $Pt^{3+}$ or $Pt^{4+}$, which can be represented, for example, in the form of $PtX_2$, $PtX_3$, $PtX_4$, $[PtA_6]X_2$, $M^1_2[PtX_4]$, $M^1_2[PtX_2Y_2]$, $M^1[PtX_3Y]$, $M^1[PtX_2Y_2]$ or $M^1_2[PtX_6]$ (in which X and Y each is an anion such as $F^-$, $Cl^-$, $Br^-$, $I^-$, $OH^-$, $CN^-$, $NO_3^-$, $N_3^-$, $CH_3COO^-$, $SCN^-$, acetylacetonato, $1/2SO_4^{2-}$ or $1/2CO_3^{2-}$, $M^1$ is a monovalent cation such as K, Na or H, and A is $NH_3$ or an amine). Specifically, there may be mentioned $PtCl_2$, $PtBr_2$, $PtI_2$, $Pt(CN)_2$, $Pt(SCN)_2$, $PtCl_3$, $PtBr_3$, $PtI_3$, $PtF_4$, $PtCl_4$, $PtBr_4$, $PtI_4$, $K_2[PtCl_2(acac)_2]$ and $H_2PtCl_6$.

The ruthenium salt includes those containing $Ru^{2+}$, $Ru^{3+}$ or $Ru^{4+}$, which can be represented, for example, in the form of $RuX_2$, $RuX_3$, $RuX_4$, $[RuX_6]M^1_3$ or $M^1[RuX_4]$ (in which X is a halogen such as Cl or Br or an anion such as $NO_3^-$ or $SO_4$, and $M^1$ is a monovalent cation such as K, Na, Rb, Cs or H). As specific examples, there may be mentioned $RuCl_3$, $((NH_4)_2RuCl_6$, $Ru(SO_4)_2$, $RuS_2$, $RuO_2$, $RuO_4$, $Na_2RuO_4$ and $K_2RuO_4$.

The iridium salt includes those containing $Ir^+$, $Ir^{2+}$, $Ir^{3+}$ or $Ir^{4+}$, which can be represented, for example, in the form of IrX, $IrX_2$, $IrX_3$, $IrX_4$, $[IrX_6]M^1_3$ or $M^1[IrX_4]$ (in which X is a halogen such as Cl or Br or an anion such as $SO_4$, and $M^1$ is a monovalent cation such as K, Na, Rb, Cs or H). As specific examples, there may be mentioned $KIr(SO_4)_2$, $RbIr(SO_4)_2$ and $CsIr(SO_4)_2$.

The palladium salt includes those containing $Pd^{2+}$, which can be generally represented in the form of $Pd—Z_2$. Z is a halogen such as Cl, Br or I or a moiety forming such a salt as acetate, trifluoroacetate, acetylacetonate, carbonate, perchlorate, nitrate, sulfate or oxide. As specific examples, there may be mentioned $PdCl_2$, $PdBr_2$, $PdI_2$, $Pd(OCOCH_3)_2$, $Pd(OCOCF_3)_2$, $PdSO_4$, $Pd(NO_3)_2$ and PdO.

The osmium salt includes those containing $Os^+$, $Os^{2+}$, $Os^{3+}$ or $Os^{4+}$, which can be expressed, for example, in the form of OsX, $OsX_2$, $OsX_3$ or $OsX_4$, $[OsX_6]M^1_3$ or $M^1[OsX_4]$ (in which X is a halogen such as Cl or Br or an anion such as $SO_4$, and $M^1$ is a monovalent cation such as K, Na, Rb, Cs or H). As specific examples, there may be mentioned $OsBr_4$, $OsO_4$, $OsCl_4$, $KOs(SO_4)_2$, $RbOs(SO_4)_2$ and $CsOs(SO_4)_2$.

The rhodium salt includes those containing $Rh^{3+}$, which can be represented in the form of $RhX_3$, $Rh_2X_6$, $[RhA_6]X_3$, $M^1_3[RhX_6]$ or $M^1[RhX_4]$ (in which X is a halogen such as F or Cl or an anion such as CN or $SO_4$, $M^1$ is a monovalent cation such as K, Na or H and A is $NH_3$ or an amine). As specific examples, there may be mentioned $Rh_2O_3$, $RhO_2$, $Rh_2(SO_4)_3$, $Rh(OH)_3$, $Rh(NO_3)_3$, $RhCl_3$, $RhF_3$, $Rh(CN)_3$, $KRh(SO_4)_2$, $Na_2RhCl_4$, $NaRh(SO_4)_2$ and $HRh(SO_4)_2$.

The solvent capable of dissolving or dispersing the metal salt cannot be specified in an absolute manner since the solubility differs depending on the functional group of the solvents. It includes, however, water, ketones such as acetone and methyl ethyl ketone, esters such as ethyl acetate, alcohols such as methanol and ethanol, aprotic polar solvents such as dimethylformamide, dimethyl sulfoxide, sulfolane, diglyme and hexamethylphosphorotriamide, and, further, nitromethane and acetonitrile, among others. In particular, water and hydrophilic organic solvents, such as alcohols or ketones, in admixture with water can be suitably used.

The concentration of the metal salt may vary depending on the solvent used for dissolving the salt but may amount from 0.001% to the saturated solution concentration for the salt. At levels lower than 0.001%, the amount of the metal colloid formed is insufficient and, at levels exceeding the saturated solution concentration, solid salt precipitation unfavorably occurs. When the solvent is water, a concentration of 0.01 to 20%, preferably 0.1 to 5%, is generally used.

The colloid formation conditions can be such that the metal ion is gradually reduced to form fine metal particles upon treatment of the metal salt-containing solution by stirring under reducing conditions. The reducing conditions may be established, for example, by maintaining the solvent in a hydrogen atmosphere and achieving a condition enabling the hydrogen atmosphere to come into contact with the solution, or by adding a reducing reagent to the solution. The reducing agent to be used can be selected from among those well known to those skilled in the art in the relevant field. For example, there may be mentioned metal hydride complex compounds, such as sodium borohydride or lithium borohydride and related compounds, lithium aluminum hydride, trialkoxy derivatives thereof $LiAlH(OR)_3$ and sodium bis(2-methoxyethoxy)aluminum hydride, specifically including sodium borohydride, sodium trimethoxyborohydride, sodium cyanoborohydride, sodium triacetoxyborohydride, lithium tri-sec-butylborohydride, potassium tri-sec-butylborohydride, lithium trisiamylborohydride, potassium trisiamylborohydride, lithium trialkoxyborohydrides, potassium trialkoxyborohydrides, lithium triethylborohydride, zinc borohydride and calcium borohydride, as well as alkyl boranes such as borane, diborane, complexes of borane with THF, dimethyl sulfide, an amine or the like, thexylborane, disiamylborane, 9-borabicyclo[3.3.1]nonane, catecholborane and isopinocampherylborane, hydrazine, thioethanolamine, dithiothreitol, reduced glutathione, cystein and so forth. In a preferred embodiment of the invention, a colloidal alloy nanoparticle solution can be prepared by adding an aqueous solution containing sodium borohydride dissolved therein to an aqueous solution prepared by dissolving citric acid monohydrate, chloroplatinic(IV) acid hexahydrate and ruthenium(III) chloride hydrate and stirring the mixture for 10 minutes to 10 days.

The metal or alloy nanoparticles obtained in the above manner are subjected to surface modification so that a porous substance comprising an inorganic oxide can readily bind to the surface thereof. The surface modification of the nanoparticles can be accomplished by treating the colloidal nanoparticle solution with a coupling agent-containing solution. The coupling agent may be a silane coupling agent. The silane coupling agent generally includes compounds represented by the general formula: $X-A-Si(OR)_n R'_{n-3}$ (in which X is a functional group, for example an amino, mercapto, halogen, epoxy, vinyl, methacryloxy, acryloxy or N-(aminoalkyl) amino group, A is an alkyl chain or the like, for example $—(CH_2)_2—$, $—(CH_2)_3—$ or $—(CH_2)_4—$, and R and R' may be the same or different and each is a straight or branched alkyl group generally containing 1-6 carbon atoms) and derivatives thereof. As typical examples of the silane coupling agent, there may be mentioned N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, N-(vinylbenzyl)-2-aminoethyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, p-styryltrimethoxysilane, vinyltrichlorosilane, vinyltrimethoxysilane, vinyltriethoxysilane, vinyltriacetoxysilane, octadecyldimethyl[3-(trimethoxysilyl)propyl]ammonium chloride and the like. In the practice of the invention, 3-aminopropyltrimethoxysilane, in particular, can be suitably used.

The coupling agent can be used in the form of a diluted solution prepared by using such a solvent as mentioned above and is generally used in the form of an aqueous solution and, in certain cases, in the form of an aqueous solution with a small amount of acetic acid added thereto. As for the coupling agent concentration, any appropriate concentration can be used and, for example, a coupling agent solution having a concentration of 0.001 to 5.0%, or 0.01 to 1.0%, may be added to the colloidal metal or alloy nanoparticle solution.

The colloidal solution of the metal or alloy nanoparticles surface-modified in the above manner is subjected to conditions for forming a porous substance comprising an inorganic oxide to thereby cause the inorganic oxide-based porous substance to bind to the surface of the surface-modified metal or alloy nanoparticles so as to produce surface-modified nanoparticles having an inorganic oxide-based porous substance on the surface thereof.

The inorganic oxide to be used can be selected from among those well known to those skilled in the art in the relevant field, including $SiO_2$, $TiO_2$ and $SnO_2$, among others. In the practice of the invention, the use of silica ($SiO_2$) is particularly preferred. Various silica species, for example natural products or synthetic products, crystalline or noncrystalline, are known and, as for the methods of synthesis thereof, various techniques are known. Any one selected from among those techniques suited for use in the practice of the invention can be used. For example, reference can be made to Japanese Kokai Publication No. H09-30809 and the documents cited therein. In the practice of the invention, the technology of synthetic silica production can be suitably utilized. Synthetic silica species can be produced generally by the wet process or dry process, and the wet process includes methods roughly classified into settlement (precipitation) method and gelation method. Synthetic silica is generally formed by the neutralization reaction between an aqueous solution of sodium silicate and an inorganic acid (generally sulfuric acid) to form silica. When coagulation is allowed to proceed at an acidic pH where the growth of primary particles is suppressed, gelation occurs owing to the three-dimensional network structure formed by the aggregate; the thus-obtained product is called silica obtained by the gelation method. On the other hand, when the reaction is allowed to proceed at a relatively high temperature and at an alkaline pH, the growth of primary silica particles proceeds fast and primary particles aggregate and settle in the form of flock, and the product thus obtained is called silica obtained by the settlement method. In this manner, it is possible to control the particle size and particle structure of silica by controlling the reaction temperature, pH, salt concentration and so forth.

In the practice of the invention, an aqueous solution of sodium silicate is added to the above-mentioned colloidal solution of surface-modified metal or alloy nanoparticles and the mixed solution is maintained at a pH of 6.0 to 12.0, in certain cases at a pH of 7.0-12.0, more suitably at a pH of 8.0-9.0, to attain the purpose of forming silica and coating the surface of the metal or alloy nanoparticles with the silica formed. The time of reaction of the mixed solution can be properly selected according to the intended purpose and is, for example, 30 minutes to 10 days, in typical cases, 6 hours to 4 days. In preferred cases, the time of reaction of the mixture is 1.5 to 2.5 days.

The surface-modified nanoparticles obtained can be isolated from the resulting dispersion by an ordinary means of separation. As typical separation methods, there may be mentioned filtration and centrifugation, among others. The surface-modified nanoparticles separated can also be dried according to need.

The surface-modified metal nanoparticles of the invention are characterized in that they have, on the surface thereof, a porous substance comprising an inorganic oxide.

Preferred as the metal nanoparticles are particles comprising the metal nanoparticles with Pt and a poisoning-preventing element coexisting on the surface thereof or core-shell type particles comprising nanoparticles carrying a poisoning-preventing element and coated with a Pt layer with a thickness of 2 nm or less.

On the other hand, the particle diameter of the metal nanoparticles is not particularly restricted provided that the particle diameter can secure a Pt surface area necessary for attaining a desired level of catalytic activity; preferably, however, it is not greater than 5 nm. The technology of the invention has succeeded in preparing nanoparticles with an average particle diameter of 2.3 nm without allowing aggregation. Further, Pt/Ru binary nanoparticles with a particle diameter of 2 nm, for instance, have been successfully produced. The Pt content in the metal nanoparticles is not particularly restricted provided that the Pt content is sufficient for attaining a desired level of catalytic activity. A Pt content of 20 atom percent or higher is preferred, however.

Figure 5:
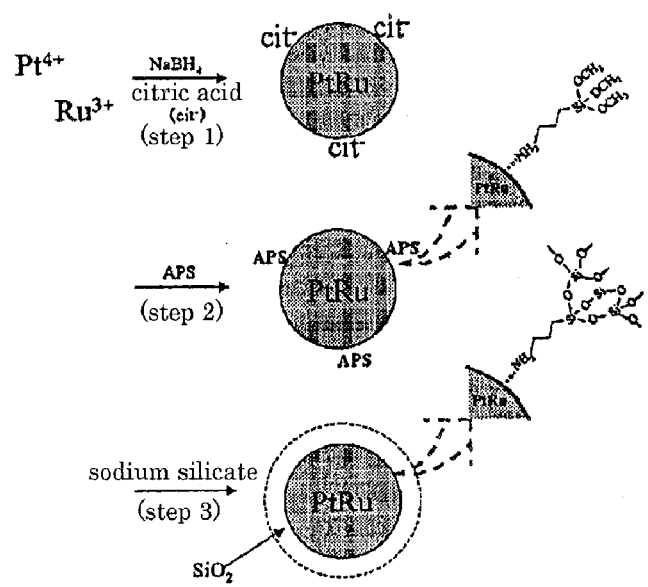
FIG. 5 This figure shows a scheme for producing Pt—Ru alloy nanoparticles and encapsulated nanoparticles.
Figure 6:
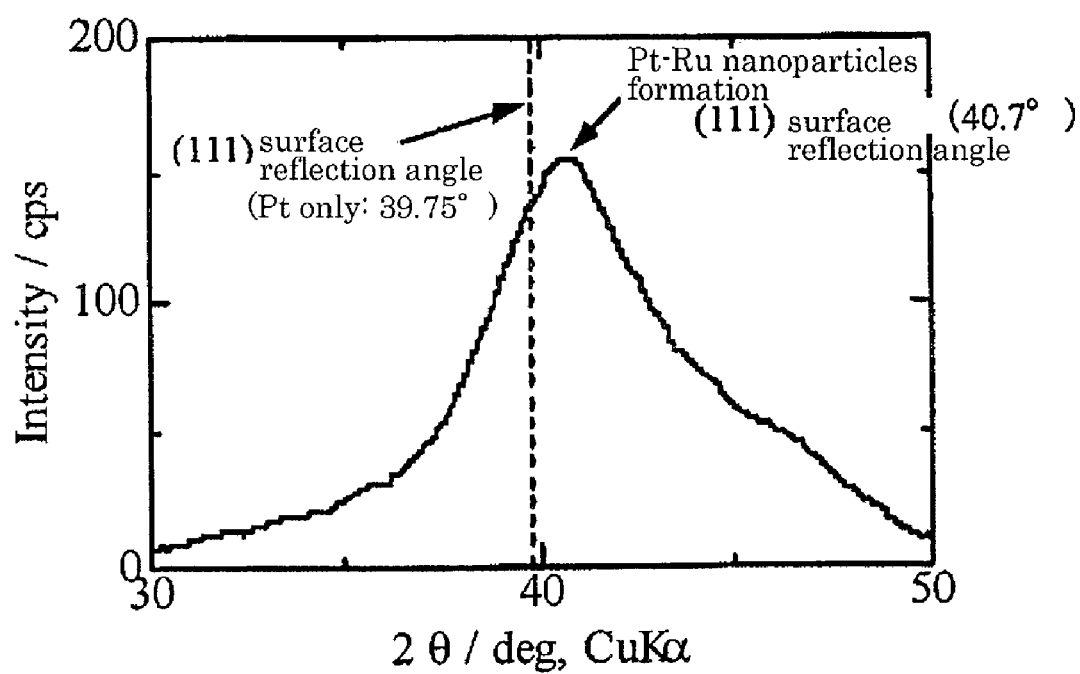
FIG. 6 This figure shows an X ray diffraction curve of Pt—Ru nanoparticles.

A scheme for the production of Pt—Ru alloy nanoparticles according to the invention, which are effective in preventing CO poisoning of the Pt surface, and of encapsulated nanoparticles is shown in FIG. 5. When, in accordance with the present invention, a solution containing Pt ions and Ru ions coexisting therein, for instance, is reduced with $NaBH_4$ in step 1 shown in FIG. 5, nanoparticles are formed, and the nanoparticles have an average particle diameter of about 2 nm and are in an alloy form, as confirmed by X ray diffraction measurement (cf. FIG. 6). In step 2 and step 3 shown in FIG. 5, the Ru—Pt alloy nanoparticles were coated with a silica layer with a thickness of about 1-2 nm to give encapsulated nanoparticles. The silica coat layer is very thin, hence will not prevent a substance(s) from diffusing therethrough. Thus, it secures high activity and prolonged life simultaneously. A catalyst comprising the encapsulated nanoparticles showed an initial catalytic activity level equivalent to the levels of the products currently on the market and, further, the decrease in activity thereof was found suppressed by the effect of encapsulation in silica spheres. The catalyst carrying the encapsulated nanoparticles was allowed to stand in an aqueous solution of sulfuric acid and the durability of the catalyst in acidic solution was evaluated in terms of particle diameter, surface area, and methanol oxidation current-based activity. As a result, even after 1000 hours of standing in sulfuric acid, no increase was found in particle diameter, and no decreases were found in surface area and catalytic activity (on the other hand, a commercial catalyst evaluated in the same manner showed an activity decrease of about 30% after 1000 hours of standing).

Further, the above-mentioned inorganic oxide-based porous substance is not particularly restricted provided that the substance can prevent mutual aggregation/agglomeration of catalyst particles. Preferred, however, are substances occurring stably in such a strongly acidic atmosphere as the environment in which PEFC electrodes are used. As examples of such substances, there may be mentioned $SiO_2$, $TiO_2$ and $SnO_2$. The layer thickness of the porous substance is not particularly restricted provided that the thickness is sufficient for preventing mutual contacting of metal nanoparticles. Preferably, however, the thickness should be such that the diffusion of a fuel to the metal nanoparticle surface or the conduction of electrons formed by the oxidation reaction to the carrier or support will not be inhibited. The pore diameter of the porous substance is not particularly restricted provided that the fuel can diffuse to the metal nanoparticle surface. Preferably, however, the pore size should be such that metal nanoparticles whose surface is exposed through the pores will not contact with one another.

The nanoparticles according to the technology of the invention can be said to be encapsulated nanoparticles with the surface thereof being coated with a porous substance comprising an inorganic oxide such as silica. As described hereinabove, the encapsulation of nanoparticles in silica spheres or the like can be realized using an aqueous solution system and an alcohol solution system, among others. For example, mention may be made of encapsulated nanoparticles with a very thin porous substance layer, such as a silica layer, with a thickness of about 0.5 to 2 nm as formed around each nanoparticle with a particle diameter of about 2-3 nm. It has been established that the catalyst prepared by using the encapsulated nanoparticles of the invention as coated with a porous substance such as silica produces no particular phenomenon of inhibiting the diffusion of substances involved in the reaction and shows no particular decreases in activity thereof.

On the other hand, the catalyst for PEFC electrodes according to the invention is constituted of the above-mentioned surface-modified catalyst nanoparticles and carbon as the support. The support carbon species is not particularly restricted provided that the carbon species has electric conductivity. Since, however, the carbon is required to abundantly adsorb the above-mentioned catalyst nanoparticles, carbon species high in surface area are preferred. The catalyst for PEFC electrodes is preferably subjected to heat treatment in order to eliminate impurities from the metal nanoparticle surface. However, even when it is not subjected to heat treatment, the effects of the invention can be produced.

The surface-modified nanoparticles obtained according to the invention can be used to constitute electrodes in the conventional manner by compounding with a polymer electrolyte membrane substrate such as a perfluorocarbon membrane substrate and applying the compound to carbon paper or the like. The polymer electrolyte membrane for electrodes to be used can be selected from among those known to those skilled in the art in the relevant field and, for example, the one sold under the trademark Nafion™ can be properly used. The carbon to be used in constituting electrodes can be properly selected according to the intended purpose from among those occurring as powders, fibers or granules, among others, and mixtures thereof. Utilizable as typical carbon species are carbon powders, spherical carbon black, scaly graphite, pitch, fibrous carbon, hollow carbon balloons and the like. Various species of carbon black are known and can be characterized by the particle diameter, specific surface area, nitrogen pore volume and oil absorption. For example, mention may be made of VULCAN™ XC72R (product of Cabot), BLACK PEARLS™ 2000 (product of Cabot), Ketjen black, furnace black, acetylene black and activated carbon, among others. As the fibrous carbon, there may be mentioned, for example, isotropic pitch type ones, liquid crystal pitch type ones and PNA type ones, and an appropriate one can be selected for use from among the commercially available ones.

The surface-modified nanoparticles obtained according to the invention can also be used for constituting a catalyst for electrodes in the conventional manner by compounding with carbon as a support.

The surface-modified nanoparticles obtained according to the invention can also be baked or fired according to need to give moldings. The firing can be carried out in an atmosphere of an oxidizing gas, a reducing gas such as argon-hydrogen or ammonia, or an inert gas such as argon, helium or nitrogen. The heat treatment temperature can be selected properly so that it may serve as an optimal temperature and, as for the treatment time, an optimal range can be properly selected by carrying out experiments. In typical cases, the heat treatment temperature is 150° C.-350° C. in an oxidizing gas atmosphere and, in a reducing gas or inert gas atmosphere, it is 150° C.-1000° C. and, in particular, treatment at a temperature of 200° C. or higher is preferred in certain cases. The treatment time is, for example, 0.5 to 8 hours and, in certain instances, it is preferably 1-4 hours.

The thus-obtained moldings or the like can be suitably used as electrodes for PEFC type fuel cells.

The following examples illustrate the present invention more specifically. However, these examples are provided simply for the purpose of illustration of the present invention and for offering for reference some specific modes of embodiment thereof. These exemplifications are provided for the purpose of illustration of the certain specific modes of the present invention, hence they are not intended to restrict or limit the scope of the invention disclosed herein. It should be understood that various modes of embodiment of the invention are possible based on the idea of the invention as disclosed herein.

Except for the details given, all the examples were carried out or can be carried out using those standard techniques which are well known and conventional to those skilled in the art.

EXAMPLE 1

FIG. 1 is a schematic representation of a Pt—Ru alloy nanoparticle-carrying catalyst. The catalyst (catalyst A) shown in FIG. 1 was prepared in the following manner.

First, a colloidal solution of Pt—Ru alloy nanoparticles was prepared by adding an aqueous solution (33 mL) containing 128 mg of sodium borohydride (product of Wako Pure Chemical) dissolved therein to an aqueous solution (1967 mL) containing 63 mg of citric acid monohydrate (product of Wako Pure Chemical), 125 mg of chloroplatinic(IV) acid hexahydrate (product of Wako Pure Chemical) and 63 mg of ruthenium(III) chloride n-hydrate (product of Wako Pure Chemical) dissolved therein, and stirring the mixture for 1 day. It was confirmed by observation under a transmission electron microscope that the Pt—Ru alloy nanoparticles obtained had a particle diameter of about 2 nm, as described later herein.

Thereafter, an aqueous solution (250 µl) containing 0.842 µl of 3-aminopropyltrimethoxysilane (product of Aldrich) dissolved therein was added to the colloidal solution of Pt—Ru alloy nanoparticles as obtained in the above manner. After 20 minutes, 80 mL of an aqueous solution of sodium silicate as adjusted to pH 10.5 was added, and the resulting mixture was stirred for 2 days to coat the nanoparticles with porous $SiO_2$. To this solution was added an aqueous dispersion (20 mL) of 109 mg of VULCAN™ XC72R (product of Cabot), and the mixture was stirred for 1 day, followed by centrifugation/drying to give the catalyst A.

The catalyst A was observed under a transmission electron microscope and it was confirmed that the $SiO_2$-coated Pt—Ru alloy nanoparticles had been adsorbed on the surface of the carbon support without undergoing aggregation. The particle diameter of the Pt—Ru alloy nanoparticles was about 2 nm, and the $SiO_2$ coat layer thickness was about 1 nm.

Then, an electrode was produced by applying a slurry prepared by mixing the catalyst A (50 mg) with 600 mg of a 5% Nafion™ 117 solution (product of Wako Pure Chemical) onto a sheet of carbon paper (TGP-H-060; product of Toray). For evaluating the durability of this electrode, the electrode was immersed in a 1.5 M aqueous solution of sulfuric acid for 270 hours, and the changes in Pt surface area on electrode and methanol oxidation current after immersion in sulfuric acid were evaluated by comparison with the values before immersion. The Pt surface area was determined from the electric charge in the hydrogen desorption region in the cyclic voltamogram of the electrode produced as measured in a 1.5 M aqueous solution of sulfuric acid. The methanol oxidation current was measured by sweeping the electric potential of the product electrode in a mixed aqueous solution containing sulfuric acid (1.5 M) and methanol (5 M) and recording the current value at the electric potential of 0.5 V versus standard hydrogen electrode. As a result, the Pt surface area in the electrode showed no substantial change even after 270 hours of immersion in the aqueous sulfuric acid solution (before immersion: 446 $cm^2$; after immersion: 447 $cm^2$). The methanol oxidation current, too, showed almost no change even after 270 hours of immersion in the aqueous sulfuric acid solution (before immersion: 19 mA; after immersion: 18 mA).

Comparative Example 1

Figure 2:
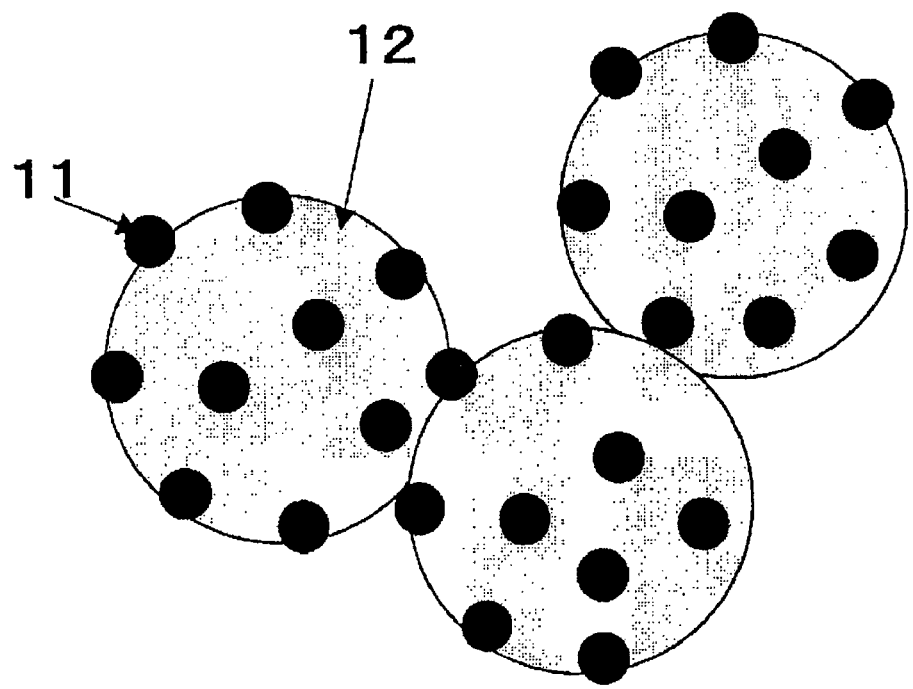
FIG. 2 This figure schematically illustrates the structure of a catalyst carrying Pt—Ru alloy nanoparticles as prepared by carrying out the steps of alloy nanoparticle formation and supported catalyst preparation substantially in the same manner as in Example 1 except for the omission of the step of porous substance formation on the alloy nanoparticle surface.

A schematic representation of a nanoparticle-carrying catalyst (catalyst B) to be used for comparison with the catalyst A is shown in FIG. 2. The catalyst B was prepared in the following manner.

First, a colloidal solution of Pt—Ru alloy nanoparticles was prepared by adding an aqueous solution (33 mL) containing 128 mg of sodium borohydride (product of Wako Pure Chemical) dissolved therein to an aqueous solution (1967 mL) containing 63 mg of citric acid monohydrate (product of Wako Pure Chemical), 125 mg of chloroplatinic(IV) acid hexahydrate (product of Wako Pure Chemical) and 63 mg of ruthenium(III) chloride n-hydrate (product of Wako Pure Chemical) dissolved therein, and stirring the mixture for 1 day. To this solution was added an aqueous dispersion (20 mL) of 109 mg of VULCAN™ XC72R (product of Cabot), and the mixture was stirred for 1 day, followed by centrifugation/drying to give the catalyst B. The catalyst B was observed under a transmission electron microscope and it was confirmed that the Pt—Ru alloy nanoparticles had been adsorbed on the surface of the carbon support without undergoing aggregation. The particle diameter of the Pt—Ru alloy nanoparticles was about 2 nm.

Then, an electrode was produced by applying a slurry prepared by mixing the catalyst B (50 mg) with 600 mg of a 5% Nafion™ 117 solution (product of Wako Pure Chemical) onto a sheet of carbon paper (TGP-H-060; product of Toray). For evaluating the durability of this electrode, the electrode was immersed in a 1.5 M aqueous solution of sulfuric acid for 270 hours, and the changes in Pt surface area on electrode and methanol oxidation current after immersion in sulfuric acid were evaluated by comparison with the values before immersion. The Pt surface area was determined from the electric charge in the hydrogen desorption region in the cyclic voltamogram of the electrode produced as measured in a 1.5 M aqueous solution of sulfuric acid. The methanol oxidation current was measured by sweeping the electric potential of the product electrode in a mixed aqueous solution containing sulfuric acid (1.5 M) and methanol (5 M) and recording the current value at the electric potential of 0.5 V versus standard hydrogen electrode. As a result, the Pt surface area in the electrode markedly decreased after 270 hours of immersion in the aqueous sulfuric acid solution (before immersion: 768 $cm^2$; after immersion: 491 $cm^2$). The methanol oxidation current, too, markedly decreased after 270 hours of immersion in the aqueous sulfuric acid solution (before immersion: 24 mA; after immersion: 6 mA).

EXAMPLE 2

Figure 3:
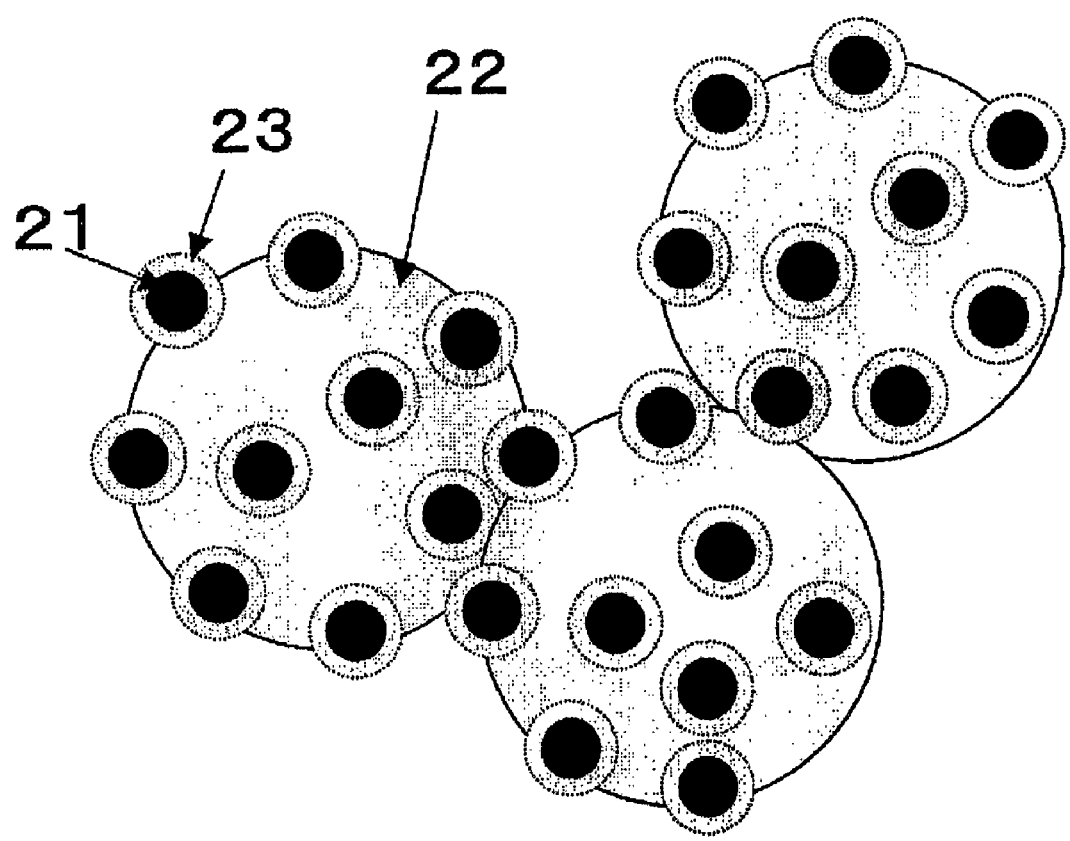
FIG. 3 This figure schematically illustrates the structure of a catalyst carrying porous inorganic oxide-coated metal nanoparticles, with a porous inorganic oxide occurring on the Pt metal nanoparticle surface.

FIG. 3 is a schematic representation of a Pt nanoparticle-carrying catalyst. The catalyst shown in FIG. 3 (catalyst C) was produced in the following manner.

First, a colloidal solution of Pt nanoparticles was prepared by adding an aqueous solution (33 mL) containing 128 mg of sodium borohydride (product of Wako Pure Chemical) dissolved therein to an aqueous solution (1967 mL) containing 63 mg of citric acid monohydrate (product of Wako Pure Chemical) and 250 mg of chloroplatinic(IV) acid hexahydrate (product of Wako Pure Chemical) dissolved therein, and stirring the mixture for 1 day. Then, an aqueous solution (250 µl) containing 0.842 µl of 3-aminopropyltrimethoxysilane (product of Aldrich) dissolved therein was added. After 20 minutes, 80 mL of an aqueous solution of sodium silicate as adjusted to pH 10.5 was added, and the resulting mixture was stirred for 2 days to coat the nanoparticles with porous $SiO_2$. To this solution was added an aqueous dispersion (20 mL) of 218 mg of VULCAN™ XC72R (product of Cabot), and the mixture was stirred for 1 day, followed by centrifugation/drying to give the catalyst C. The catalyst C was observed under a transmission electron microscope and it was confirmed that the $SiO_2$-coated Pt nanoparticles had been adsorbed on the surface of the carbon support without undergoing aggregation. The particle diameter of the Pt nanoparticles was about 2 nm, and the $SiO_2$ coat layer thickness was about 1 nm.

Then, an electrode was produced by applying a slurry prepared by mixing the catalyst C (50 mg) with 600 mg of a 5% Nafion™ 117 solution (product of Wako Pure Chemical) onto a sheet of carbon paper (TGP-H-060; product of Toray). For evaluating the durability of this electrode, the electrode was immersed in a 1.5 M aqueous solution of sulfuric acid for 270 hours, and the changes in Pt surface area on electrode and methanol oxidation current after immersion in sulfuric acid were evaluated by comparison with the values before immersion. The Pt surface area was determined from the electric charge in the hydrogen desorption region in the cyclic voltamogram of the electrode produced as measured in a 1.5 M aqueous solution of sulfuric acid. The methanol oxidation current was measured by sweeping the electric potential of the product electrode in a mixed aqueous solution containing sulfuric acid (1.5 M) and methanol (5 M) and recording the current value at the electric potential of 0.8 V versus standard hydrogen electrode. As a result, the Pt surface area in the electrode showed no substantial change even after 270 hours of immersion in the aqueous sulfuric acid solution (before immersion: 892 $cm^2$; after immersion: 894 $cm^2$). The methanol oxidation current, too, showed almost no change even after 270 hours of immersion in the aqueous sulfuric acid solution (before immersion: 0.9 mA; after immersion: 0.8 mA).

Comparative Example 2

Figure 4:
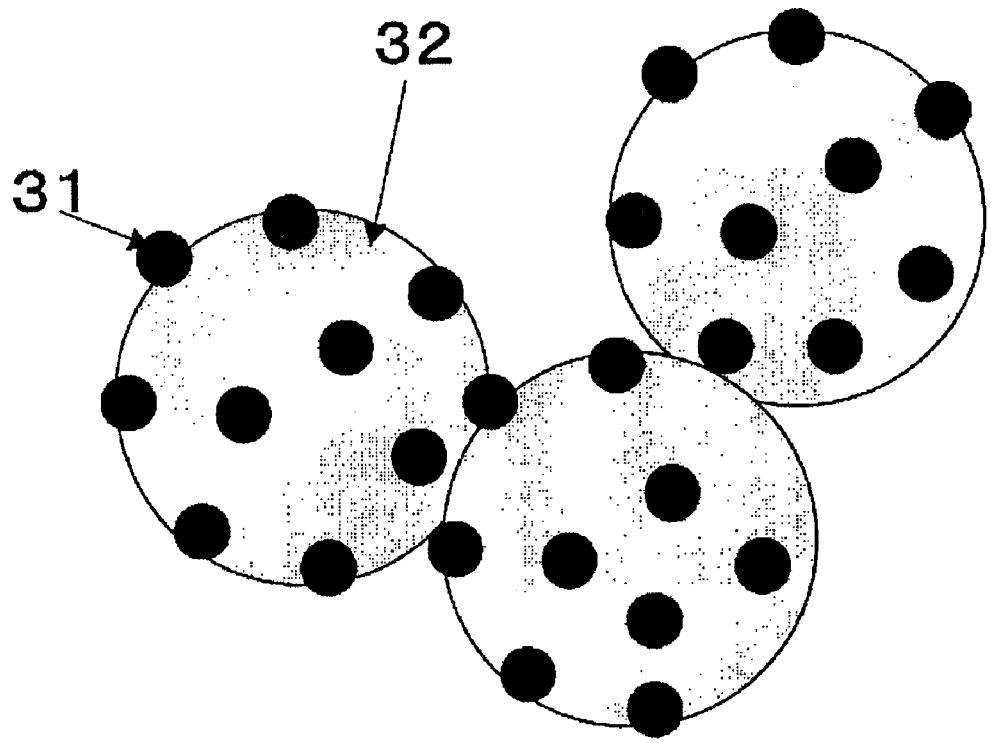
FIG. 4 This figure schematically illustrates the structure of a catalyst carrying Pt nanoparticles as prepared by carrying out the steps of metal nanoparticle formation and supported catalyst preparation substantially in the same manner as in Example 2 except for the omission of the step of porous substance formation on the nanoparticle surface.

A schematic representation of a nanoparticle-carrying catalyst (catalyst D) to be used for comparison with the catalyst C is shown in FIG. 4. The catalyst D was prepared in the following manner.

First, a colloidal solution of Pt nanoparticles was prepared by adding an aqueous solution (33 mL) containing 128 mg of sodium borohydride (product of Wako Pure Chemical) dissolved therein to an aqueous solution (1967 mL) containing 63 mg of citric acid monohydrate (product of Wako Pure Chemical) and 250 mg of chloroplatinic(IV) acid hexahydrate (product of Wako Pure Chemical) dissolved therein, and stirring the mixture for 1 day. To this solution was added an aqueous dispersion (20 mL) of 218 mg of VULCAN™ XC72R (product of Cabot), and the mixture was stirred for 1 day, followed by centrifugation/drying to give the catalyst D. The catalyst D was observed under a transmission electron microscope and it was confirmed that the Pt nanoparticles had been adsorbed on the surface of the carbon support without undergoing aggregation. The particle diameter of the Pt nanoparticles was about 2 nm.

Then, an electrode was produced by applying a slurry prepared by mixing the catalyst D (50 mg) with 600 mg of a 5% Nafion™ 117 solution (product of Wako Pure Chemical) onto a sheet of carbon paper (TGP-H-060; product of Toray). For evaluating the durability of this electrode, the electrode was immersed in a 1.5 M aqueous solution of sulfuric acid for 270 hours, and the changes in Pt surface area on electrode and methanol oxidation current after immersion in sulfuric acid were evaluated by comparison with the values before immersion. The Pt surface area was determined from the electric charge in the hydrogen desorption region in the cyclic voltamogram of the electrode produced as measured in a 1.5 M aqueous solution of sulfuric acid. The methanol oxidation current was measured by sweeping the electric potential of the product electrode in a mixed aqueous solution containing sulfuric acid (1.5 M) and methanol (5 M) and recording the current value at the electric potential of 0.8 V versus standard hydrogen electrode. As a result, the Pt surface area in the electrode markedly decreased after 270 hours of immersion in the aqueous sulfuric acid solution (before immersion: 1536 $cm^2$; after immersion: 982 $cm^2$). The methanol oxidation current, too, markedly decreased after 270 hours of immersion in the aqueous sulfuric acid solution (before immersion: 1.1 mA; after immersion: 0.3 mA).

INDUSTRIAL APPLICABILITY

According to the present invention, highly functional nanoparticles having high activity and good stability can be provided and thus materials useful as catalysts for fuel cells and so forth can be provided. The instability problem arising, among others, from aggregation peculiar to nanoparticles can be solved by using those highly functional nanoparticles, and the field of application thereof can be enlarged. In the field of portable power sources, in particular, it becomes possible to provide cells which are inexpensive and stably high in capacity.

It is obvious that the present invention can be practiced in various ways other than those particularly described in the foregoing description and examples. In view of the foregoing teaching, a number of modifications and variations of the present invention are possible and, accordingly, they also fall within the scope of the claims attached hereto.

The invention claimed is:

1. Surface-modified metal nanoparticles comprising platinum group metal-containing nanoparticles of an alloy of Pt and Ru that have been treated with a silane coupling agent and having, on the surface thereof, a porous substance comprising an inorganic oxide.

2. Nanoparticles according to claim 1 wherein said surface-modified metal nanoparticles show an oxidative catalytic activity against hydrogen and methanol.

3. Nanoparticles according to claim 1 wherein said platinum group metal-containing nanoparticles have an average particle diameter not greater than 10 nm.

4. Nanoparticles according to claim 1 wherein said platinum group metal-containing nanoparticles have an average particle diameter of about 2-10 nm.

5. Nanoparticles according to claim 1 wherein said inorganic oxide is $SiO_2$.

6. A catalyst comprising nanoparticles as claimed in claim 1 supported on a carrier or support.

7. A nanoparticle-containing catalyst according to claim 6 wherein the catalyst is a catalyst for a polymer electrolyte fuel cell (PEFC) electrode.

8. A fuel cell electrode comprising nanoparticles as claimed in claim 1 used as a catalyst for the electrode.

9. A fuel cell comprising a fuel cell electrode as claimed in claim 8.

10. The surface-modified metal nanoparticles as claimed in claim 1, wherein the porous substance comprising the inorganic oxide formed on the surface of the platinum group metal-containing nanoparticles has a pore diameter large enough to permit methanol to diffuse to the platinum group metal-containing nanoparticles and small enough to prevent a surface of the platinum group metal-containing nanoparticles exposed through the pores from contacting one another.

11. The surface-modified metal nanoparticles as claimed in claim 1, wherein the porous substance comprising said inorganic oxide formed on the surface of the platinum group metal-containing nanoparticles has a thickness of about 0.5 to 2 nm.

12. A method of producing surface-modified metal nanoparticles which comprises:
   (1) the step of treating platinum group metal-containing nanoparticles of an alloy of Pt and Ru with a silane coupling agent to provide silane coupling agent-treated nanoparticles, and
   (2) the step of forming a porous substance comprising an inorganic oxide in the presence of the silane coupling agent-treated nanoparticles, in that order to obtain surface-modified metal nanoparticles comprising the platinum group metal-containing nanoparticles with a porous substance comprising said inorganic oxide as formed on the surface thereof.

13. A method of producing surface-modified metal nanoparticles according to claim 12 wherein said surface-modified metal nanoparticles show a oxidative catalytic activity against hydrogen and methanol.

14. A method of producing surface-modified metal nanoparticles according to claim 12 wherein said coupling agent is a silane coupling agent.

15. The surface-modified metal nanoparticles produced by the method of claim 12.

16. The surface-modified metal nanoparticles as claimed in claim 15, wherein the porous substance comprising said inorganic oxide formed on the surface of the platinum group metal-containing nanoparticles has a pore diameter large enough to permit methanol to diffuse to the platinum group metal-containing nanoparticles and small enough to prevent a surface of the platinum group metal-containing nanoparticles exposed through the pores from contacting one another.

17. The surface-modified metal nanoparticles as claimed in claim 15, wherein the porous substance comprising said inorganic oxide formed on the surface of the platinum group metal-containing nanoparticles has a thickness of about 0.5 to 2 nm.

18. A method of producing surface-modified metal nanoparticles which comprises:
   (1) the step of forming nanoparticles by subjecting a platinum group metal ion-containing solution to containing Pt and Ru to reduction treatment,
   (2) the step of treating the nanoparticles with a silane coupling agent to provide a silane coupling agent treated nanoparticles, and
   (3) the step of forming a porous substance comprising an inorganic oxide in the presence of the silane coupling agent-treated nanoparticles, in that order to obtain surface-modified metal nanoparticles comprising the platinum group metal-containing nanoparticles of an alloy of Pt and Ru with a porous substance comprising said inorganic oxide as formed on the surface thereof and showing an oxidative catalytic activity against hydrogen and methanol.

19. The surface-modified metal nanoparticles produced by the method of claim 18.

20. The surface-modified metal nanoparticles according to claim 19, wherein the porous substance comprising said inorganic oxide formed on the surface of the platinum group metal-containing nanoparticles has a pore diameter large enough to permit methanol to diffuse to the platinum group metal-containing nanoparticles and small enough to prevent a surface of the platinum group metal-containing nanoparticles exposed through the pores from contacting one another.

21. The surface-modified metal nanoparticles as claimed in claim 19, wherein the porous substance comprising said inorganic oxide formed on the surface of the platinum group metal-containing nanoparticles has a thickness of about 0.5 to 2 nm.

* * * * *